(12) United States Patent
Kotik et al.

(10) Patent No.: US 6,956,937 B2
(45) Date of Patent: *Oct. 18, 2005

(54) APPARATUS AND METHOD FOR NETWORK-INITIATED REAL-TIME MULTI-PARTY COMMUNICATIONS

(75) Inventors: Paul Kotik, Plantation, FL (US); Andrew Egendorf, Lincoln, MA (US)

(73) Assignee: Pilgrim Telephone, Inc., Cambridge, MA (US)

(*) Notice: Subject to any disclaimer, the term of this patent is extended or adjusted under 35 U.S.C. 154(b) by 62 days.

This patent is subject to a terminal disclaimer.

(21) Appl. No.: 10/648,871

(22) Filed: Aug. 27, 2003

(65) Prior Publication Data

US 2004/0037405 A1 Feb. 26, 2004

Related U.S. Application Data

(63) Continuation of application No. 10/318,992, filed on Dec. 13, 2002, now Pat. No. 6,690,780, which is a continuation-in-part of application No. 09/797,065, filed on Mar. 1, 2001, now Pat. No. 6,504,921.

(51) Int. Cl.[7] ............... H04M 3/42; H04M 3/56; H04M 7/00; H04Q 3/00

(52) U.S. Cl. ............ 379/201.01; 379/196; 379/201.06; 379/201.1; 379/201.11; 379/202.01; 379/207.12; 379/210.03; 379/221.14; 379/900; 379/912; 379/913

(58) Field of Search ............ 379/207.02, 207.03, 379/207.12, 210.03, 211.02, 216.01, 220.01, 221.01, 221.14, 900, 912, 913, 196, 197, 198, 201.01, 201.02, 201.06, 201.1, 201.11, 202.01, 203.01, 204.01, 205.01, 206.01; 370/352

(56) References Cited

U.S. PATENT DOCUMENTS

| | | | |
|---|---|---|---|
| 5,701,340 A | 12/1997 | Zwick | 379/204.01 |
| 5,818,836 A | 10/1998 | DuVal | 370/389 |
| 6,148,067 A | 11/2000 | Leipow | 379/201.01 |
| 6,504,921 B2 * | 1/2003 | Kotik et al. | 379/201.01 |
| 6,690,780 B2 * | 2/2004 | Kotik et al. | 379/201.01 |

FOREIGN PATENT DOCUMENTS

| | | |
|---|---|---|
| EP | 0717545 A2 | 6/1996 |
| WO | WO 00/19344 | 4/2000 |
| WO | WO 00/22802 | 4/2000 |

* cited by examiner

Primary Examiner—Harry S. Hong
(74) Attorney, Agent, or Firm—Hogan & Hartson LLP

(57) ABSTRACT

A method for providing telecommunications services in a telecommunications network. A telecommunications service provider monitors data relating to communications initiation or termination criteria for at least two communicants in the telecommunications network and initiates or terminates communications between the at least two communicants if, by processing the data, it is determined that the criteria have been met.

51 Claims, 3 Drawing Sheets

US 6,956,937 B2

APPARATUS AND METHOD FOR NETWORK-INITIATED REAL-TIME MULTI-PARTY COMMUNICATIONS

CROSS REFERENCE TO RELATED APPLICATIONS

This application is a continuation application of application Ser. No. 10/318,992 filed Dec. 13, 2002 and now U.S. Pat. No. 6,690,780 which, is a continuation-in-part of U.S. Ser. No. 09/797,065 filed Mar. 1, 2001 and now U.S. Pat. No. 6,504,921.

FIELD OF THE INVENTION

The present invention relates to telecommunications systems and more particularly to a novel mode of operation in which a telecommunications system itself initiates a message exchange between two or more communicants, conditioned upon the system's determination of the utility (i.e., the usefulness or value) yielded by that initiative.

BACKGROUND OF THE INVENTION

Real-time telecommunications systems have conventionally operated in a communicant-driven mode, in which the first step in a message exchange is that of a communicant transmitting a request for a channel to another specific communicant. The request may be accepted by the second communicant, with acceptance followed by a message exchange, which may be in real time, over a channel set up by the network following acceptance of the initial "request for message exchange" (hereinafter, "RFME"). The messages exchanged may be oral (e.g., by telephone), electronic (e.g., "instant messaging" or e-mail over the Internet), physical (e.g., by telegram), or any combination thereof.

As used herein, the term "telecommunications network" refers to all elements of an electrical, electronic, optical, or acoustical communications system, including those elements involved in the carriage, routing, switching, storage, forwarding, modulating, encrypting, or decrypting of messages, but excluding those elements which, in a particular instance, are defined herein as "communicants".

As used herein, the term "communicant" refers to an originator or a recipient of a message carried by the network.

As used herein, the term "addressable device" refers to a device to which messages may be sent using a network address. An addressable device may be either a part of the network, or a communicant, depending upon its function. For example, in the public switched telephone network (hereinafter, "PSTN"), when a person answers a ringing telephone, the telephone is an addressable device, and the person is a communicant. In contrast, when a telephone answering machine automatically answers a call, the telephone answering machine is both an addressable device and a communicant.

The PSTN is perhaps the most ubiquitous example of a real-time telecommunications network operating in this conventional, communicant-driven mode. In its most general form, an addressable device (e.g., a station device, which may be an ordinary telephone), is caused by a communicant to go "off-hook", and, upon receipt of a dial tone, to transmit an RFME to another station device by dialing the telephone number that constitutes that device's network address. The station device then accepts this request by itself going off-hook, and a full-duplex audio channel is opened between the two station devices. Station devices and full-duplex audio channels are conventionally related in a one-to-one fashion (i.e., in a single-channel protocol), such that a station device can support only one concurrent full-duplex audio channel.

This mode of operation is characterized by a familiar set of failure conditions which diminish its utility to communicants, to the operator of the telecommunications system, and to the economic and social entities served by the telecommunications system (e.g., people, businesses, society as a whole).

Some of these failure conditions are:

Receiver Station Busy: The addressable device to which an RFME is addressed may be engaged in another message exchange at the time the request is transmitted. Insofar as the system architecture does not permit stations to interact with multiple simultaneous real-time channels, the message exchange desired by the initiating communicant cannot occur at that time. An example of this in the world of conventional telephony is a busy signal.

Addressable Device Not Responsive: The addressable device to which the RFME is addressed, although not at that time engaged in another message exchange, does not respond to the RFME. An example of this in the world of conventional telephony is where a telephone rings, but it is not answered.

Communicant Not Responsive: The addressable device to which the RFME is addressed responds to the request by going off hook, but the communicant with whom the initiating communicant desires to communicate does not respond to the addressable device. An example of this in the world of conventional telephony is where an answering machine answers a call.

Network Failure/Channel Teardown: A communications channel is torn down absent a valid request from at least one of the communicants, or a designed initiative of the network itself. An example of this is teardown of a wireless telephony channel when one of the wireless telephones loses contact with the network.

Each of these failure conditions diminishes the utility derived from the telecommunications network. The time and the expense invested by the initiating communicant in the attempt to establish real-time message exchange with the other communicant fails in each case to yield the sought-after utility and so are lost. Similarly, revenues and/or other utility associated with network usage are lost by the network operator and/or network owner.

Other opportunity costs may be incurred by the initiating communicant insofar as his addressable device, while engaged in a failed attempt to establish communications with another communicant, is not available to initiate or accept other message exchanges.

A familiar and ubiquitous set of solutions has developed with regard to these failure conditions, although each of these solutions has shortcomings, and fails to achieve the maximum possible utility sought by communicants and/or by the network's operators and/or owners.

Queuing is widely used as a solution to the problems caused by single-channel protocol that many networks have imposed upon communicants.

A typical queuing solution eliminates some or all denials of RFME by incorporating a network layer upstream of the communicant in the network architecture. This intermediary layer can accept multiple concurrent requests for message exchange addressed to the communicant, manage multiple concurrent real-time message channels, and hand off each such channel to the communicant as the communicant's addressable device becomes available. A familiar example of this class of queuing solution is seen in PBX and similar devices, in conjunction with PSTN hunt groups or functionally similar PSTN provisioning.

A striking feature of the queuing solution to denial of RFME in single-channel protocol networks is that the initiating communicant, while queued for the communicant to which he addressed the RFME, is functionally segregated from all other network communicants. His addressable device is dedicated to waiting in a queue, and cannot accept RFMEs or initiate an RFME to other communicants. Enormous amounts of time are lost by communicants being "placed on hold". This inefficiency, from the queued communicant's standpoint, can be mitigated somewhat if he, too, has a queuing solution which allows him to initiate and receive RFMEs while the outgoing RFME is queued.

Another familiar solution to failures of communicant-initiated RFME entails reducing the communications mode from real-time to store-and-forward.

The conventional telephone answering machine is an example of this class of solution, wherein the communicant's addressable device is available but the communicant himself is not responsive for one reason or another.

Telco "voice mail" is another example, which, depending on the implementation, may also involve a queuing component. In any case, when the outcome of an RFME addressed to a specific addressable device is not accepted (i.e., the addressable device is not available or does not expressly accept the RFME) the network offers to record a message from the initiating communicant which may subsequently be made available to the addressee.

All of the solutions to the inefficiencies and lack of utility inherent in communicant-initiated networks are aimed at mitigation, and do not alter the role of the network as a passive entity.

In contrast, Network Initiated Communications (hereinafter, "NIC") offers an alternative mode which differs fundamentally from the conventional, communicant-initiated mode of establishing communications between communicants.

NIC offers:

1. A solution to avoid losing utility from the failure conditions described earlier, rather than a solution which mitigates the effects of such lost utility; and 2. Opportunities for exploitation of novel classes of utility inherent in present telecommunications technology, such as wireless networks.

One object of the present invention is therefore to overcome the disadvantages of the communicant-initiated methods and systems for communications by providing a network-initiated method and system for communications.

Another object of the present invention is to allow for new types of communications, not possible with conventional communicant-initiated communication methods and systems.

SUMMARY OF THE INVENTION

In accordance with the present invention, communicants on a telecommunications network do not attempt to initiate communications with other communicants by the addressing of an RFME, but rather, the network itself initiates setup of message exchange between two or more network communicants when the network determines that pre-specified or calculated conditions or criteria are met.

The types of conditions which are necessary and/or sufficient for NIC may vary as a function of the technological capabilities of the network to measure, calculate, and identify the parameters comprising those conditions, and as a function of the utility desired by the network's users, owners and other interested parties.

One broad class of conditions or criteria are those comprised of parameters associated with the physical and functional status of the network's components individually. The availability of addressable devices, the traffic load as a percentage of maximum capacity, the operating history of individual or aggregated network components, the physical location of one or more addressable devices and, in the case of wireless, the movement of one or more addressable devices may all be taken into account as determinants of NIC.

Environmental parameters such as date, time, weather conditions, pollution levels, tides, and ambient radiation levels are another such class of parameters.

Other variables associated with human activities such as financial, commercial, political, and economic parameters, transportation systems' status and schedules, individuals' personal attributes, preferences and desires, and offers of goods, services, companionship, etc. are another class of parameters.

The values assigned by the network to the variables it uses in determining whether or not to initiate communication between two or more network communicants can be determined by the network itself, can be obtained from the communicants, and/or can be obtained from other sources external to the network. The values can be assigned to these variables at any time in the determination process.

The network's determination that the conditions have been met for initiating a real-time communication between two or more network communicants is preferably the outcome of an analysis which may be arithmetic, logical, statistical, historical, probabilistic, or random, or may incorporate elements of more than one, or all, of these methodologies.

The method of analysis executed in a particular instance may be specified by any interested party, including the network's designer(s), owner(s), operator(s), or users(s), either singly or in any combination.

In accordance with the present invention, the determination to initiate communications between two or more communicants can be based upon any combination of the above-mentioned parameters and methods of analysis. Additionally, a randomizing factor may be introduced into the determination. For example, a communicant may wish to receive a call at a randomly selected time and/or with a randomly selected person chosen from among those who meet certain criteria.

The execution of the analysis determining NIC between two or more network communicants is supported in a facility central to the network architecture (a connection processor), such that the connection processor is receptive of the status of all network components, and of all data ("input data"), involved in the determination of the initiation of communications.

The input data itself may be maintained centrally or in distributed fashion, or both.

For example, a central database may consist of a routing table using conventional physical addressing enhanced by a conditional addressing element consisting of each communicant's criteria for acceptance of NICs. Rather than consisting only of a network address, as in the PSTN, of the form NPA-NXX-SSSS, this conditional address may consist, for example, of both a conventional PSTN NPA-NXX-SSSS address, and additional data, such as Hours of Receptivity, Acceptable Co-Communicant (e.g., one or more NPA-NXX-SSSS addresses), procedural logic to be used in the determination of whether or not to initiate communications, etc.

An example of such procedural logic which would initiate a call between the communicant entering the procedural logic into the connection processor and the station device with address 212-555-1234 during specified times is:

| | |
|---|---|
| IF | (Current Time is within Hours of Receptivity) |
| AND | (Co-Communicant NPA-NXX-SSSS = 212-555-1234) |
| AND | (No connection has been made within 30 days) |
| THEN | CONNECT |
| ELSE | DO NOT CONNECT |

Data elements such as personal attributes, addressable device status, addressable device properties, and station-specific procedural logic may be maintained at the station level in the network architecture, or at any other level within or without the network architecture as determined by technical, economic, and/or convenience criteria, so long as such data elements are accessible to the connection processor.

In one embodiment of the present invention, a wireless telephone subscriber A traveling in a distant city Y specifies to the wireless network a receptivity to communications with other wireless subscribers based in his home city, X, but currently located in city Y.

When the wireless network determines that:

Subscriber A's wireless telephone is not busy;

AND With respect to another subscriber, B, whose wireless telephone is based in city X, that B's wireless telephone is currently located in city Y;

AND B's wireless telephone is not busy;

AND B is receptive to NIC compatible with A's characteristics and requirements the wireless network will initiate call setup between the wireless telephones of A and B.

This very simple embodiment yields the utility of establishing telephone contact between two persons with a common characteristic, in this case the home city, with no time or effort spent by either party in actively searching for, or attempting to contact, the other.

The foregoing and other features and advantages of the present invention will become more apparent in light of the following detailed description of exemplary embodiments of the invention, as illustrated in the accompanying drawings, wherein:

DETAILED DESCRIPTION OF THE INVENTION

Figure 1:
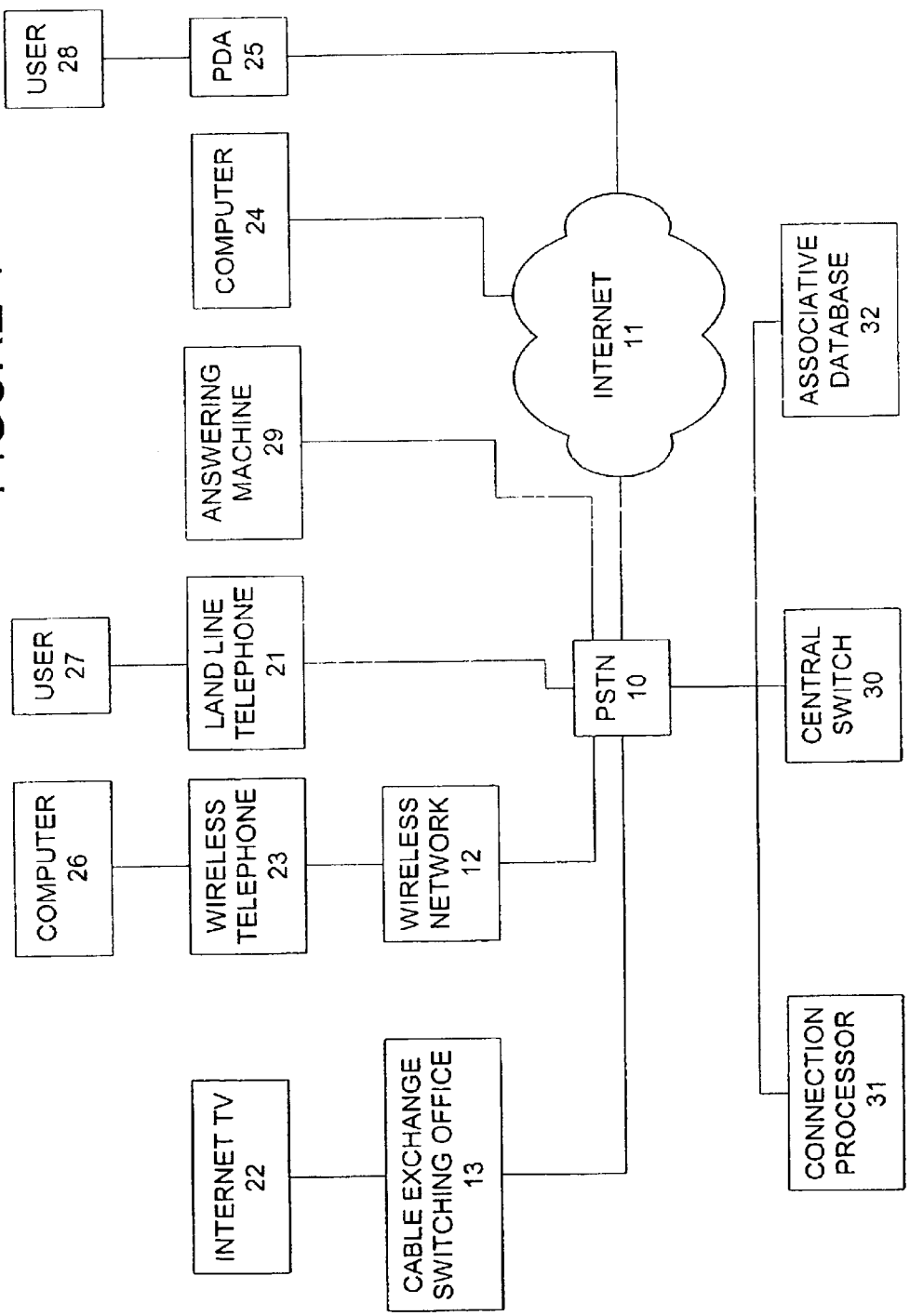
FIG. 1 shows a communication system according to an embodiment of the present invention.

As shown in FIG. 1, an embodiment of the present invention includes a communications network to which communicants such as computers 24, 26, users 27, 28, Internet TV 22 and answering machine 29 may connect to send and receive messages. The communicants connect to the network by way of addressable devices such as Internet TV 22, wireless telephone 23, land line telephone 21, answering machine 29, computer 24 and PDA 25. While the drawing shows a single example of each communicant and addressable device, it is understood that a plurality of communicants and devices are contemplated. The network preferably includes the Public Switched Telephone Network 10, a cable television network interfaced by a cable exchange switching office 13, a wireless network 12 and the Internet 11. The network according to the invention may include one or more of the foregoing networks in combination or it may include one or more of each network either alone or in combination with others. While the Internet is shown, it is understood that intranets and other networks of that type can be used.

The system according to the present invention for carrying out the invention over the network includes a central switch 30 connected to the network and to an associative database 32 that maintains information about the parameters involved in determining if and when to initiate communications. This information includes data about the network communicants such as personal attributes, data relating to the network devices such as network address, availability status (such as on-hook and off-hook), and device type.

The system also has a connection processor 31 to initiate communications between communicants when conditions are met. The connection processor can be a single computer such as a Windows based PC, a Macintosh based computer or a plurality of computers connected together. The connection processor makes the logical determination if and when the data warrants call initiation based upon the information in the database and the data received through the switch 30. For example, communicant A may wish to communicate from his land line telephone with an expert in a certain field if and only if that expert is located in a specific geographic area. The system, knowledgeable of the personal attributes of communicants and the locations of fixed and mobile addressable devices, can detect the presence of such an expert's land line or wireless telephone in the geographic area and initiate a telephonic connection between communicant A and the expert.

Alternatively, communicant A may wish to communicate from his wireless telephone with the expert under a condition of specified geographic proximity. As communicant A moves about, the system can determine proximity between A and the expert (if it has sufficient input data), and initiate the network connection when the specific proximity criteria are met.

The complexity and sophistication of NIC are virtually limitless. By way of example and without limitation to the scope of the present invention, criteria may include geographic, spatial, temporal, historical, personal, behavioral, device type, network address specification, and/or any other information that can be represented in the system's database.

When the system recognizes that conditions for NIC have been met, it attempts to establish communications between two or more users. For example, the system may initiate a teleconference with a specified list of portfolio managers if the market price of a specified security falls below a specified price.

According to another embodiment, the system may recognize that a message exchange previously set up either in conventional, communicant-initiated mode, or in accordance with the present invention, has terminated absent a valid termination request from a communicant and absent a designed network termination initiative. The system may initiate re-establishment of the failed message exchange.

According to yet another embodiment, a communicant may specify conditions which prevent the network from including him in a NIC, such as a time restriction.

According to yet another embodiment, the network's operators may specify conditions which prevent or require a communicant's inclusion in one or more classes of NIC, such as account delinquency.

In addition to the limitations a user may place upon communications with himself, the system may have criteria by which it will not initiate a communication, and third parties may likewise define criteria that will prevent the network from initiating communications. This may include statistical and probabilistic classes, fuzzy criteria, and/or tolerances for failure. The connection processor may learn about communicants'operating characteristics over time and incorporate this experience into the database.

When the conditions for initiating a specific NIC are met, the system automatically initiates a set-up of the communication.

Consider an example wherein a communicant's telephone service is provided by his cable television provider. The communicant may specify to the system database a personal attribute which is non-receptivity to telephone calls while the cable TV converter box is on, or is on and tuned to a particular channel. If so decided by the communicant, this attribute may be taken as sufficient to prevent NICs to that communicant during that time period.

In a similar example, communicants may specify receptivity to communications from other communicants who are currently tuned in to the same cable TV channel as they are.

A feature of the invention may provide for various novel services to communicants using mobile addressable devices. For example, the system may track the location of a wireless communicant and initiate communications between that communicant and service vendors who have specified a desire to communicate with wireless communicants in specified locations, or within specified proximity to a specified geographic location. Similarly, the previous example could be further limited by a time parameter, such that NIC is initiated with a restaurant only at meal time.

Figure 2:
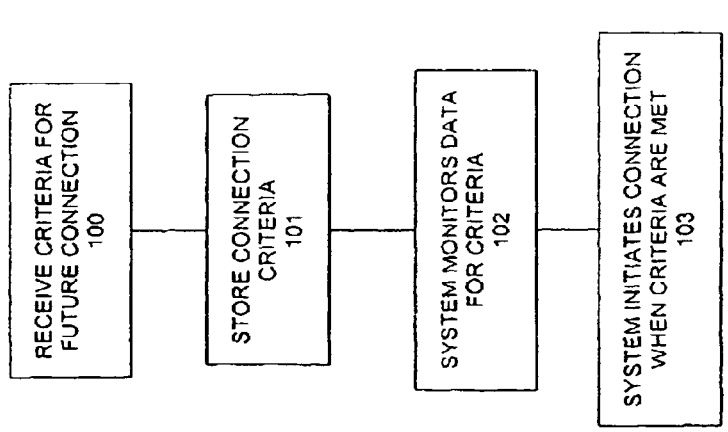
FIG. 2 is a flow chart of one embodiment of the present invention.

The various applications of the system are wide ranging. Novel services that may be provided include telephone call set-up between specified parties conditioned on historical levels of network communications between those parties, to insure minimum or maximum levels of interaction. As shown in FIG. 2, one basic method of the present invention involves the system receiving criteria for a future connection in step 100. In step 101, the system stores the connection criteria in the database and in step 102, the system monitors data relating to the criteria. The system initiates the connection in step 103 when the criteria are met.

A particularly valuable utilization of the invention is to improve the handling of customer service calls.

Figure 3:
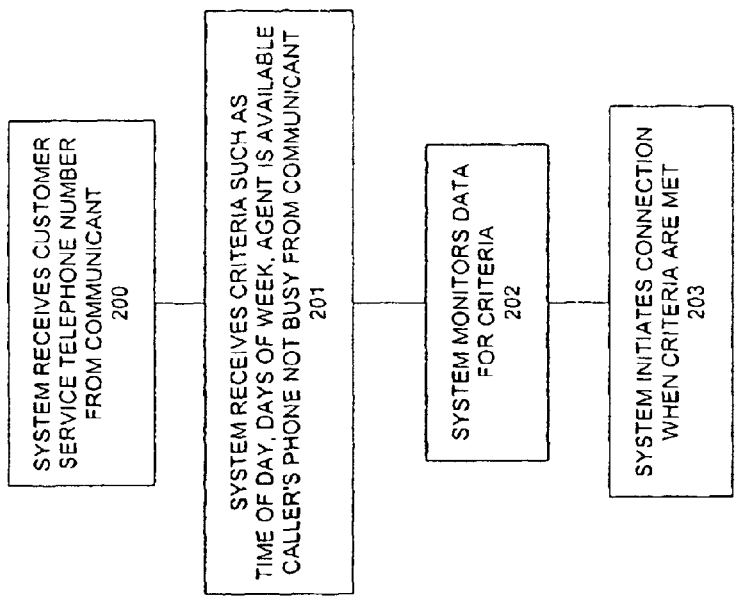
FIG. 3 is a flow chart of a further embodiment of the present invention.

For example, the invention can eliminate the necessity of a caller waiting in queue when calling a customer service center. This is shown by way of example in FIG. 3. In accordance with the invention, a communicant may specify that he wishes to communicate with the customer service center of a specified company in step 200 and also specify in step 201 when: a) his own telephone is not busy; b) the time is between 7 PM and 9 PM; c) the day is not Monday or Friday; and, d) an agent in that customer service center is available to interact with him. The connection processor will monitor the date, time, and status of the communicant's telephone and the telephones in the customer service center, in step 202 and will initiate call set-up between the communicant and the customer service agent when all of these conditions are met in step 203. This minimizes the expense of waiting in a queue for both parties to the communication, and enhances the goodwill of the company as perceived by the communicant.

Another class of implementation treats maximum allowed queue time as a variable for both sides, customer and agents, and seeks to minimize both while not requiring either to be zero. Yet another possibility is to set the queue time of the customer to zero. Call centers could pass the cost of this back to customer in the form of a monetary charge, or in some other way, perhaps as a "first class" or "VIP" mode of customer service. Another alternative is for call centers to absorb the expense, making a business decision that the good will thus purchased justifies it, perhaps perceiving a competitive advantage thus gained.

Figure 4:
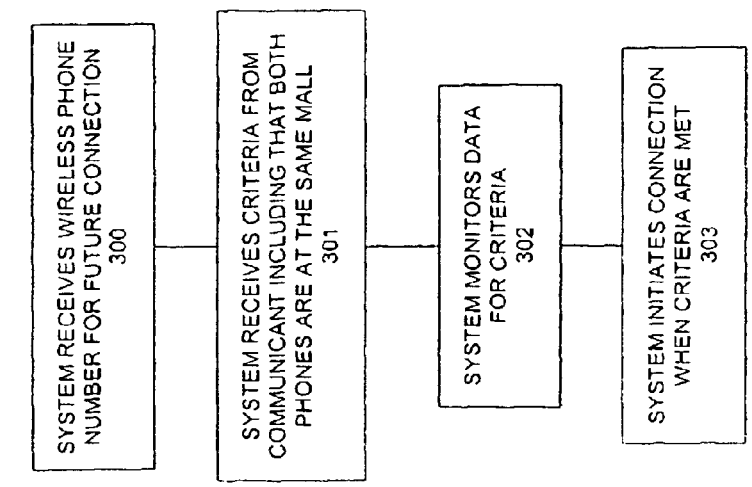
FIG. 4 is a flow chart of a still further embodiment of the present invention.

Another example is shown in FIG. 4 for initiating a call when two wireless telephone users are in the same location. In step 300, the system receives a wireless telephone number from a communicant for a future NIC. In step 301, the system receives criteria from the communicant for the NIC. In this example, the criteria include not only criteria used to determine which wireless telephone will be the second party to the NIC, but also the criterion that the two telephones be at the same mall at the same time. In step 302, the system monitors the location of the communicant's wireless telephone and the locations of all other wireless telephones which meet the criteria for being the second party to the call. In step 303, the system initiates NIC when the criteria are met; i.e., when the communicant is at the mall, and at the same time a second wireless telephone meeting the communicant's criteria is also at the mall.

Figure 5:
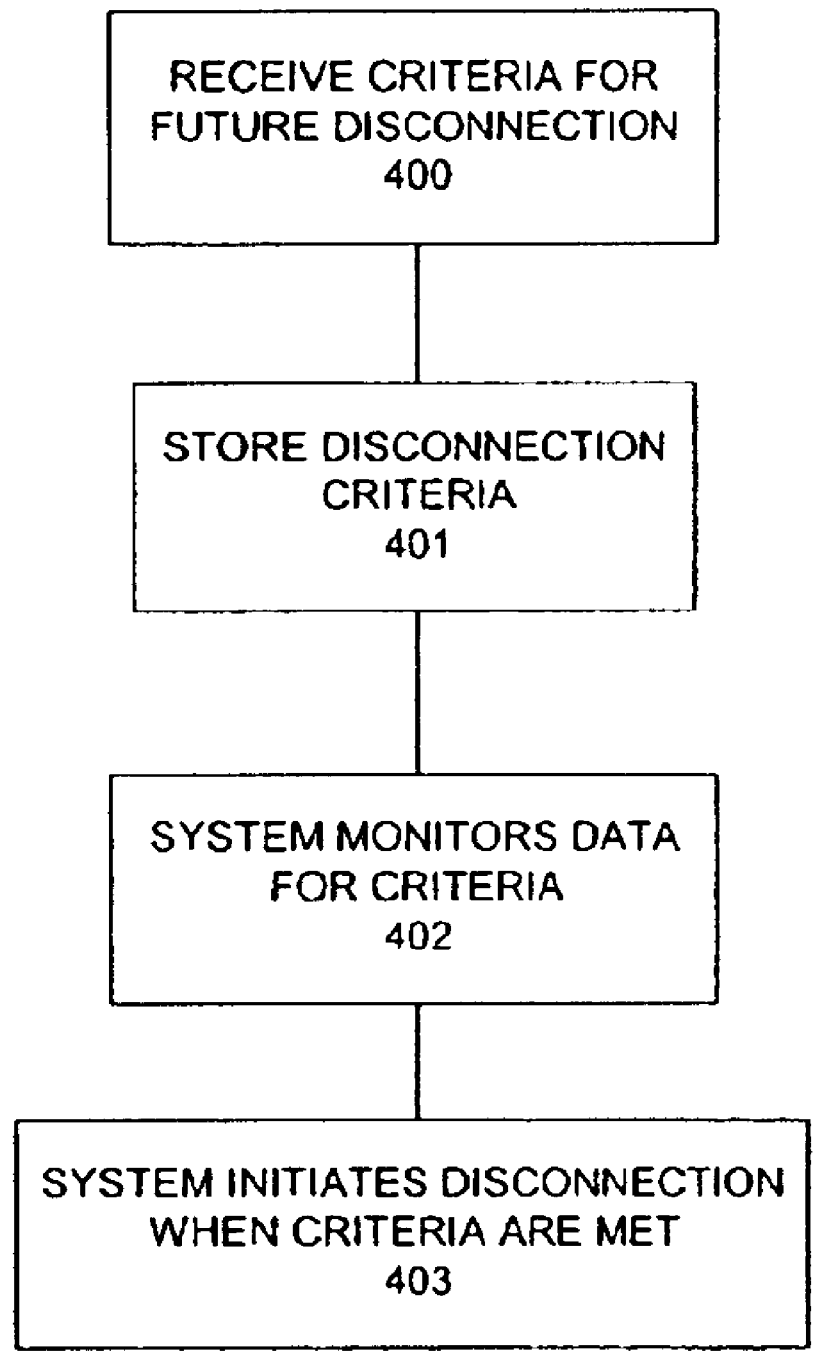
FIG. 5 is a flow chart of yet another embodiment of the present invention.

As shown in FIG. 5, another method of the present invention involves the system receiving criteria for a future disconnection in step 400. In step 401, the system stores the disconnection criteria in the database and in step 402, the system monitors data relating to the criteria. The system initiates the disconnection in step 403 when the criteria are met.

Example Applications of Network-Initiated Communications:

Automatic set-up of a telephone call between a communicant's wireless telephony device and his residential land line whenever the wireless telephone enters an area within a specified distance of the residence.

Automatic set-up of a telephone call between a communicant's wireless telephony device and a residential computer whenever the wireless telephony device enters a specified geographic area around a specified location (e.g., a particular vendor).

Automatic set-up of a telephone call between two communicant-specified wireless telephones whenever one of the wireless telephones leaves a specified geographic area.

Automatic restoration of a telephone call involving one or more wireless telephones following a channel teardown resulting from one or more of the wireless telephones' transient loss of contact with the wireless network.

Automatic set-up of a telephone call between telephony devices as specified by a communicant's interaction with a World Wide Web site or sites. For example, a call could be set up when:

1) Two or more communicants have reached the same point of exhaustion in a line of inquiry into an interactive database;
2) Two or more communicants have purchased complimentary, identical, or related information;
3) Two or more communicants have reached the same stage, or complimentary stages, or near stages, in an interactive Web video game;
4) Two or more communicants have reached the same, near, or complimentary stages in a Web educational or training program;
5) Two or more communicants have reached the same, similar, or complimentary virtual experiences in a Web virtual reality; or
6) Two or more communicants have reached the same, similar, or complimentary location or locations in a virtual world.

Automatic set-up of a telephone call between a vendor and a customer when the connection processor matches the bid and asked prices for a specified good or service.

Automatic setup of real-time messaging between Internet communicants who have requested to be connected with other randomly-selected communicants from among those meeting specified criteria.

Input data may be input by any means, including, but not limited to, the following: addressable devices, wireless telephones, land-line telephones, electronic mail, the Internet, paper forms, data file transfer, optical transmission, bar-code scanning, packet-switched networks, and wireless data transmission.

Modification of the connection configuration, including the exclusion or inclusion of specific communicants, signal modulation, connection duration, and process termination, may be determined by input data received and/or processed after the start of the connection process.

In addition to using the input data to determine whether or not to initiate a message exchange, input data may be used, with or without additional data obtained after initiation of message exchange, to modify the message exchange, for example, to add or exclude communicants, or to alter the parameters of the connection among the communicants (e.g., increasing the bandwidth of the connection to allow for video transmission).

Messages exchanged may be by e-mail. For example, a communicant may store at a network an e-mail to be sent at the time the conditions for NIC have been met. Such e-mail may be sent to any number of recipients. At the time of sending the e-mail, the network could notify the sending communicant by voice or e-mail that the conditions for NIC had been met, and that the e-mail had been sent. In another embodiment utilizing e-mail, the network notifies the communicants by e-mail that the conditions for NIC have been met.

The same sets of conditions, processes, components and utilities disclosed for NIC obtain also for Network Terminated Communications ("NTC").

NTC are channel teardowns conditioned by designed criteria, as distinct from teardowns occasioned by component failure or those conditioned on a valid request by one or more communicants signaling a request for termination of the communication. For example, wireless telephone subscribers travelling in an automobile may be forbidden by law or regulation from using the telephone while travelling at more than a specified speed. On detecting that the subscriber's wireless telephone has exceeded that speed, the network announces this condition to all communicants and tears down the call.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A method for providing telecommunications services in a telecommunications network, comprising the steps by a telecommunications service provider of:
   monitoring data relating to communications initiation criteria for at least two communicants in the telecommunications network; and
   initiating at least one of e-mail and instant-messaging communications between the at least two communicants by determining, by processing the data comprising temporal data comprising measures of elapsed time since the occurrence of a specified event or condition, that the criteria have been met.

2. A method for providing telecommunications services in a telecommunications network, comprising the steps by a telecommunications service provider of:
   monitoring data relating to communications initiation criteria for at least two communicants in the telecommunications network; and
   initiating at least one of e-mail and instant-messaging communications between the at least two communicants by determining, by processing the data comprising temporal data comprising measures of elapsed time between specified events or conditions, that the criteria have been met.

3. A method for providing telecommunications services in a telecommunications network, comprising the steps by a telecommunications service provider of:
   monitoring data relating to communications initiation criteria for at least two communicants in the telecommunications network; and
   initiating at least one of e-mail and instant-messaging communications between the at least two communicants by determining, by processing the data comprising temporal data comprising a specific time interval, that the criteria have been met.

4. A method for providing telecommunications services in a telecommunications network, comprising the steps by a telecommunications service provider of:
   monitoring data relating to communications initiation criteria for at least two communicants in the telecommunications network; and
   initiating at least one of e-mail and instant-messaging communications between the at least two communicants by determining, by processing the data comprising temporal data comprising a time range, that the criteria have been met.

5. A method for providing telecommunications services in a telecommunications network, comprising the steps by a telecommunications service provider of:
   monitoring data relating to communications initiation criteria for at least two communicants in the telecommunications network; and
   initiating at least one of e-mail and instant-messaging communications between the at least two communicants by determining, by processing the data comprising temporal data comprising a date range, that the criteria have been met.

6. The method according to claim 1, 2, 3, 4, or 5, wherein the telecommunications network is the Public Switched Telephone Network.

7. The method according to claim 1, 2, 3, 4, or 5, wherein the telecommunications network is a wireless telephony network.

8. The method according to claim 1, 2, 3, 4, or 5, wherein the telecommunications network is a wireless data network.

9. The method according to claim 1, 2, 3, 4, or 5, wherein the telecommunications network is the Internet.

10. The method according to claim 1, 2, 3, 4, or 5, wherein the telecommunications network is an intranet.

11. The method according to claim 1, 2, 3, 4, or 5, wherein the telecommunications network includes a wireless connection to the Internet.

12. The method according to claim 1, 2, 3, 4, or 5, wherein the telecommunications network is a cable television network.

13. The method according to claim 1, 2, 3, 4, or 5, wherein the telecommunications network includes at least two selected from the group consisting of the Public Switched Telephone Network, a wireless telephony network, a wireless data network, the Internet, an intranet, and a cable television network.

14. A method for providing telecommunications services in a telecommunications network, comprising the steps by a telecommunications service provider of:
    monitoring data relating to communications initiation criteria for at least two communicants in the telecommunications network; and
    initiating at least one of e-mail and instant-messaging communications between the at least two communicants by determining, by processing the data comprising network component status data, that the criteria have been met.

15. The method according to claim 14, wherein the network component status data comprise an addressable device type.

16. The method according to claim 14, wherein the network component status data comprise availability of an addressable device.

17. The method according to claim 14, wherein the network component status parameters comprise channel capacity utilization.

18. The method according to claim 14, wherein network component status parameters comprise component failure tolerance.

19. The method according to claim 14, wherein the network component status parameters comprise component failure history.

20. The method according to claim 14, wherein the network component status parameters comprise network capacity utilization.

21. The method according to claim 14, wherein the telecommunications network is the Public Switched Telephone Network.

22. The method according to claim 14, wherein the telecommunications network is a wireless telephony network.

23. The method according to claim 14, wherein the telecommunications network is a wireless data network.

24. The method according to claim 14, wherein the telecommunications network is the Internet.

25. The method according to claim 14, wherein the telecommunications network is an intranet.

26. The method according to claim 14, wherein the telecommunications network includes a wireless connection to the Internet.

27. The method according to claim 14, wherein the telecommunications network is a cable television network.

28. The method according to claim 14, wherein the telecommunications network includes at least two selected from the group consisting of the Public Switched Telephone Network, a wireless telephony network, a wireless data network, the Internet, an intranet, and a cable television network.

29. A method for providing telecommunications services in a telecommunications network, comprising the steps by a telecommunications service provider of:
    monitoring data relating to communications initiation criteria for at least two communicants in the telecommunications network; and
    initiating at least one of e-mail and instant-messaging communications between the at least two communicants by determining, by processing the data comprising communicant-specific parameters comprising at least one of sex, race, age, native language, height, weight, physical characteristics, religion, sexual preference, political affiliation, educational attainment, personal income, net worth, activity interests, aesthetic preference, culinary preference, physical fitness, intelligence, possessions, and aspirations, that the criteria have been met.

30. A method for providing telecommunications services in a telecommunications network, comprising the steps by a telecommunications service provider of:
    monitoring data relating to communications initiation criteria for at least two communicants in the telecommunications network; and
    initiating at least one of e-mail and instant-messaging communications between the at least two communicants by determining, by processing the data comprising communicant-specific parameters comprising goods, services, or consideration offered by a communicant, that the criteria have been met.

31. A method for providing telecommunications services in a telecommunications network, comprising the steps by a telecommunications service provider of:
    monitoring data relating to communications initiation criteria for at least two communicants in the telecommunications network; and
    initiating at least one of e-mail and instant-messaging communications between the at least two communicants by determining, by processing the data comprising communicant-specific parameters comprising the price or other consideration offered for goods or services by the communicant, that the criteria have been met.

32. A method for providing telecommunications services in a telecommunications network, comprising the steps by a telecommunications service provider of:
    monitoring data relating to communications initiation criteria for at least two communicants in the telecommunications network; and
    initiating at least one of e-mail and instant-messaging communications between the at least two communicants by determining, by processing the data comprising communicant-specific parameters comprising the price or other consideration sought for goods or services by the communicant, that the criteria have been met.

33. A method for providing telecommunications services in a telecommunications network, comprising the steps by a telecommunications service provider of:
    monitoring data relating to communications initiation criteria for at least two communicants in the telecommunications network; and initiating at least one of e-mail and instant-messaging communications between the at least two communicants by determining, by processing the data comprising communicant-specific parameters comprising network component parameters, that the criteria have been met.

34. The method according to claim 29, 30, 31, 32, or 33, wherein the telecommunications network is the Public Switched Telephone Network.

35. The method according to claim 29, 30, 31, 32, or 33, wherein the telecommunications network is a wireless telephony network.

36. The method according to claim 29, 30, 31, 32, or 33, wherein the telecommunications network is a wireless data network.

37. The method according to claim 29, 30, 31, 32, or 33, wherein the telecommunications network is the Internet.

38. The method according to claim 29, 30, 31, 32, or 33, wherein the telecommunications network is an intranet.

39. The method according to claim 29, 30, 31, 32, or 33, wherein the telecommunications network includes a wireless connection to the Internet.

40. The method according to claim 29, 30, 31, 32, or 33, wherein the telecommunications network is a cable television network.

41. The method according to claim 29, 30, 31, 32, or 33, wherein the telecommunications network includes at least two selected from the group consisting of the Public Switched Telephone Network, a wireless telephony network, a wireless data network, the Internet, an intranet, and a cable television network.

42. A method for providing telecommunications services in a telecommunications network, comprising the steps by a telecommunications service provider of:

monitoring data including invariant data integral to the network's design relating to communications initiation criteria for at least two communicants in the telecommunications network; and initiating at least one of e-mail and instant-messaging communications between the at least two communicants by determining, by processing the data, that the criteria have been met.

43. A method for providing telecommunications services in a telecommunications network, comprising the steps by a telecommunications service provider of:

monitoring data relating to communications initiation criteria for at least two communicants in the telecommunications network; and initiating at least one of e-mail and instant-messaging communications between the at least two communicants by determining, by processing the data by artificial intelligence methodology, that the criteria have been met.

44. The method according to claim 42 or 43, wherein the telecommunications network is the Public Switched Telephone Network.

45. The method according to claim 42 or 43, wherein the telecommunications network is a wireless telephony network.

46. The method according to claim 42 or 43, wherein the telecommunications network is a wireless data network.

47. The method according to claim 42 or 43, wherein the telecommunications network is the Internet.

48. The method according to claim 42 or 43, wherein the telecommunications network is an intranet.

49. The method according to claim 42 or 43, wherein the telecommunications network includes a wireless connection to the Internet.

50. The method according to claim 42 or 43, wherein the telecommunications network is a cable television network.

51. The method according to claim 42 or 43, wherein the telecommunications network includes at least two selected from the group consisting of the Public Switched Telephone Network, a wireless telephony network, a wireless data network, the Internet, an intranet, and a cable television network.

* * * * *